(12) United States Patent
Gordon et al.

(10) Patent No.: US 10,909,163 B2
(45) Date of Patent: Feb. 2, 2021

(54) SYSTEMS AND METHODS FOR RANKING EPHEMERAL CONTENT ITEM COLLECTIONS ASSOCIATED WITH A SOCIAL NETWORKING SYSTEM

(71) Applicant: Facebook, Inc., Menlo Park, CA (US)

(72) Inventors: Taylor Gordon, New York, NY (US); Rui Wang, New York, NY (US); Enoch Chee-Lok Lau, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 249 days.

(21) Appl. No.: 15/811,629

(22) Filed: Nov. 13, 2017

(65) Prior Publication Data

US 2019/0147056 A1 May 16, 2019

(51) Int. Cl.
*G06F 16/435* (2019.01)
*G06N 20/00* (2019.01)
*G06F 16/9535* (2019.01)
*G06F 16/2457* (2019.01)
*G06Q 50/00* (2012.01)

(52) U.S. Cl.
CPC ...... *G06F 16/435* (2019.01); *G06F 16/24578* (2019.01); *G06F 16/9535* (2019.01); *G06N 20/00* (2019.01); *G06Q 50/01* (2013.01)

(58) Field of Classification Search
CPC .................................................. G06F 16/435
See application file for complete search history.

(56) References Cited

U.S. PATENT DOCUMENTS

| | | | |
|---|---|---|---|
| 9,699,490 B1* | 7/2017 | Japp | H04N 21/251 |
| 2010/0287129 A1* | 11/2010 | Tsioutsiouliklis | G06F 16/951 |
| | | | 706/46 |
| 2011/0314029 A1 | 12/2011 | Fischer et al. | |
| 2013/0030905 A1 | 1/2013 | Fuloria et al. | |
| 2013/0124542 A1 | 5/2013 | Lee et al. | |
| 2014/0258191 A1* | 9/2014 | Gubin | G06Q 10/06393 |
| | | | 706/12 |
| 2014/0372415 A1 | 12/2014 | Fernandez-Ruiz | |
| 2016/0373396 A1 | 12/2016 | Sorg | |
| 2017/0308537 A1* | 10/2017 | Yi | G06F 16/4387 |
| 2018/0373494 A1* | 12/2018 | Loughrey | G06F 3/167 |
| 2019/0138591 A1 | 5/2019 | Kesher et al. | |
| 2019/0147057 A1* | 5/2019 | Gordon | G06N 5/022 |
| | | | 707/748 |

(Continued)

*Primary Examiner* — Dawaune A Conyers
(74) *Attorney, Agent, or Firm* — Sheppard Mullin Richter & Hampton LLP

(57) ABSTRACT

Systems, methods, and non-transitory computer readable media can perform a first ranking to rank each ephemeral content item collection of a plurality of ephemeral content item collections based on a probability of a user selecting the ephemeral content item collection. One or more ephemeral content item collections from the first ranking to provide in an ephemeral content feed of the user can be selected. A second ranking to rank each ephemeral content item collection of the plurality of ephemeral content item collections other than the selected ephemeral content item collections from the first ranking based on a probability of the user spending time on the ephemeral content item collection can be performed. One or more ephemeral content item collections from the second ranking to provide in the ephemeral content feed of the user can be selected.

19 Claims, 11 Drawing Sheets

(56) References Cited

U.S. PATENT DOCUMENTS

2019/0147112 A1\* 5/2019 Gordon ................. G06N 20/20
706/12
2019/0230186 A1 7/2019 Yellin et al.

\* cited by examiner

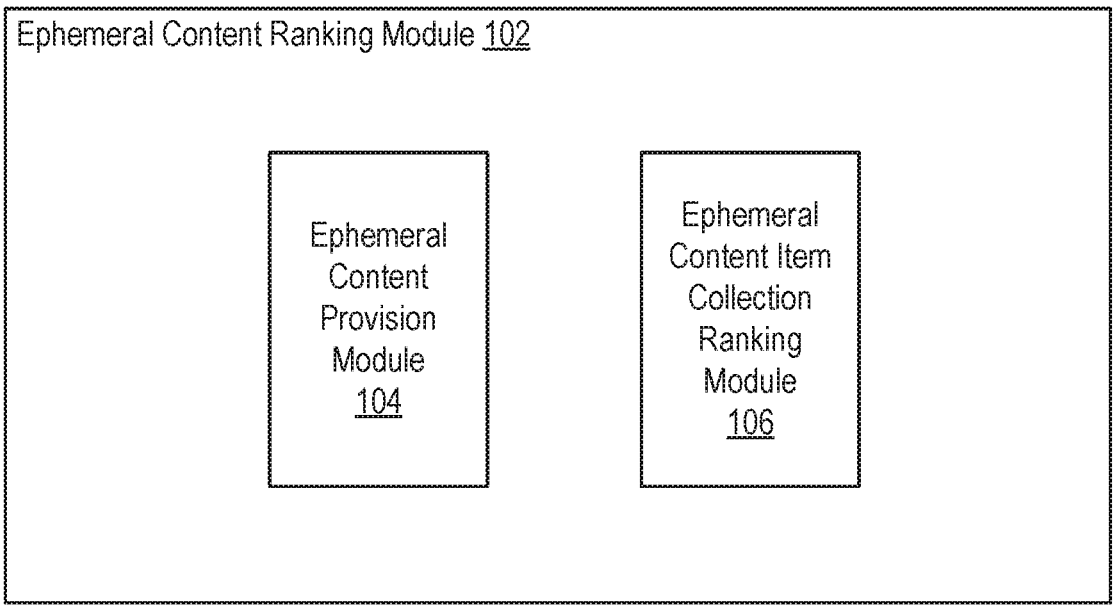
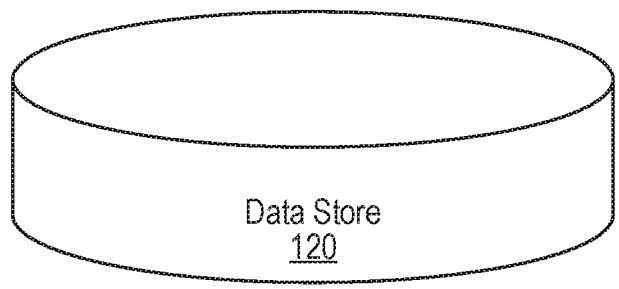
FIGURE 1

500 

Obtain a plurality of ephemeral content item collections, wherein each ephemeral content item collection of the plurality of ephemeral content item collections includes one or more ephemeral content items
502

Determine a score for each ephemeral content item collection of the plurality of ephemeral content item collections based on a probability of a user selecting the ephemeral content item collection and a probability of the user spending time on the ephemeral content item collection
504

Rank the plurality of ephemeral content item collections based on the respective scores of the plurality of ephemeral content item collections
506

```
Perform a first ranking to rank each ephemeral content item collection of a
plurality of ephemeral content item collections based on a probability of a user
selecting the ephemeral content item collection, wherein each ephemeral
content item collection of the plurality of ephemeral content item collections
includes one or more ephemeral content items
522
```

```
Select one or more ephemeral content item collections from the first ranking to
provide in an ephemeral content feed of the user
524
```

```
Perform a second ranking to rank each ephemeral content item collection of the
plurality of ephemeral content item collections other than the selected
ephemeral content item collections from the first ranking based on a probability
of the user spending time on the ephemeral content item collection
526
```

```
Select one or more ephemeral content item collections from the second ranking
to provide in the ephemeral content feed of the user
528
```

Perform a first ranking to rank each ephemeral content item collection of a plurality of ephemeral content item collections based on a probability of a user selecting the ephemeral content item collection, wherein each ephemeral content item collection of the plurality of ephemeral content item collections includes one or more ephemeral content items
542

Provide one or more ephemeral content item collections from the first ranking in an ephemeral content feed of the user
544

Receive a selection by the user of an ephemeral content item collection provided in the ephemeral content feed
546

Perform a second ranking to rank each ephemeral content item collection of the ephemeral content item collections provided in the ephemeral content feed other than the selected ephemeral content item collection based on a probability of the user spending time on the ephemeral content item collection
548

FIGURE 5C

SYSTEMS AND METHODS FOR RANKING EPHEMERAL CONTENT ITEM COLLECTIONS ASSOCIATED WITH A SOCIAL NETWORKING SYSTEM

FIELD OF THE INVENTION

The present technology relates to the field of social networks. More particularly, the present technology relates to computer networking techniques for ranking content items associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide resources through which users may publish content items. In one example, a content item can be presented on a profile page of a user. As another example, a content item can be presented through a feed for a user.

SUMMARY

Various embodiments of the present disclosure can include systems, methods, and non-transitory computer readable media configured to obtain a plurality of ephemeral content item collections, wherein each ephemeral content item collection of the plurality of ephemeral content item collections includes one or more ephemeral content items. A score for each ephemeral content item collection of the plurality of ephemeral content item collections can be determined based on a probability of a user selecting the ephemeral content item collection and a probability of the user spending time on the ephemeral content item collection. The plurality of ephemeral content item collections can be ranked based on the respective scores of the plurality of ephemeral content item collections.

In some embodiments, each of one or more ephemeral content items included in an ephemeral content item collection of the plurality of ephemeral content item collections is accessible only for a predetermined time period.

In certain embodiments, an ephemeral content item collection of the plurality of ephemeral content item collections is accessible only when at least one of one or more ephemeral content items included in the ephemeral content item collection is accessible.

In an embodiment, one or more machine learning models can be trained based on features relating to one or more of: ephemeral content item collection attributes, ephemeral content item attributes, or user attributes, and the trained machine learning models can be applied to determine the score for each ephemeral content item collection of the plurality of ephemeral content item collections.

In some embodiments, the training the one or more machine learning models includes: training a first machine learning model to determine a score indicative of a probability of a particular user selecting an ephemeral content item collection; and training a second machine learning model to determine a score indicative of a probability of a particular user spending time on an ephemeral content item collection.

In certain embodiments, the score for each ephemeral content item collection of the plurality of ephemeral content item collections is determined as a product of a score for the ephemeral content item collection based on the first machine learning model and a score for the ephemera content item collection based on the second machine learning model.

In an embodiment, at least some of the ranked plurality of ephemeral content item collections can be provided in an ephemeral content feed of the user.

In some embodiments, the at least some of the ranked plurality of ephemeral content item collections include ephemeral content item collections having scores that satisfy a threshold value.

In certain embodiments, the at least some of the ranked plurality of ephemeral content item collections include a predetermined number of top ranked ephemeral content item collections.

In an embodiment, the probability of the user selecting the ephemeral content item collection and the probability of the user spending time on the ephemeral content item collection is determined as a product of the probability of the user selecting the ephemeral content item collection and an estimated amount of time the user is likely to spend on the ephemeral content item collection if the ephemeral content item collection is selected by the user.

Various embodiments of the present disclosure can include systems, methods, and non-transitory computer readable media configured to perform a first ranking to rank each ephemeral content item collection of a plurality of ephemeral content item collections based on a probability of a user selecting the ephemeral content item collection, wherein each ephemeral content item collection of the plurality of ephemeral content item collections includes one or more ephemeral content items. One or more ephemeral content item collections from the first ranking to provide in an ephemeral content feed of the user can be selected. A second ranking to rank each ephemeral content item collection of the plurality of ephemeral content item collections other than the selected ephemeral content item collections from the first ranking based on a probability of the user spending time on the ephemeral content item collection can be performed. One or more ephemeral content item collections from the second ranking to provide in the ephemeral content feed of the user can be selected.

In some embodiments, the selected ephemeral content item collections from the first ranking and the selected ephemeral content item collections from the second ranking can be provided in the ephemeral content feed, wherein the selected ephemeral content item collections from the first ranking are provided based on an order of the first ranking and the selected ephemeral content item collections from the second ranking are provided based on an order of the second ranking.

In certain embodiments, the selected ephemeral content item collections from the first ranking are provided in the ephemeral content feed before the selected ephemeral content item collections from the second ranking.

In an embodiment, playback of one or more ephemeral content items of an ephemeral content item collection included in the ephemeral content feed can be initiated in response to user selection of the ephemeral content item collection, wherein playback of one or more ephemeral content items of the selected ephemeral content item collections from the first ranking and one or more ephemeral content items of the selected ephemeral content item collections from the second ranking in the immersive viewer is performed based on an order in which the selected ephemeral content item collections from the first ranking and the selected ephemeral content item collections from the second ranking are provided in the ephemeral content feed.

In some embodiments, the selected ephemeral content item collections from the first ranking are initially displayed in the ephemeral content feed, and the selected ephemeral content item collections from the second ranking in the ephemeral content feed are displayed in response to user navigation in the ephemeral content feed.

In certain embodiments, one or more machine learning models can be trained based on features relating to one or more of: ephemeral content item collection attributes, ephemeral content item attributes, or user attributes, and the trained machine learning models can be applied to determine one or more scores for an ephemeral content item collection.

In an embodiment, the training the one or more machine learning models includes: training a first machine learning model to determine a score indicative of a probability of a particular user selecting an ephemeral content item collection; and training a second machine learning model to determine a score indicative of a probability of a particular user spending time on an ephemeral content item collection.

In some embodiments, the first ranking is performed based on scores of the plurality of ephemeral content item collections as determined by the first machine learning model, and the second ranking is performed based on scores of the plurality of ephemeral content item collections other than the selected ephemeral content item collections from the first ranking as determined by the second machine learning model.

In certain embodiments, the selected ephemeral content item collections from the first ranking include one or more of: ephemeral content item collections from the first ranking having scores that satisfy a threshold value or a predetermined number of top ranked ephemeral content item collections from the first ranking.

In an embodiment, the selected ephemeral content item collections from the second ranking include one or more of: ephemeral content item collections from the second ranking having scores that satisfy a threshold value or a predetermined number of top ranked ephemeral content item collections from the second ranking.

Various embodiments of the present disclosure can include systems, methods, and non-transitory computer readable media configured to perform a first ranking to rank each ephemeral content item collection of a plurality of ephemeral content item collections based on a probability of a user selecting the ephemeral content item collection, wherein each ephemeral content item collection of the plurality of ephemeral content item collections includes one or more ephemeral content items. One or more ephemeral content item collections from the first ranking can be provided in an ephemeral content feed of the user. A selection by the user of an ephemeral content item collection provided in the ephemeral content feed can be received. A second ranking to rank each ephemeral content item collection of the ephemeral content item collections provided in the ephemeral content feed other than the selected ephemeral content item collection based on a probability of the user spending time on the ephemeral content item collection can be performed.

In some embodiments, initiating playback of one or more ephemeral content items of the selected ephemeral content item collection in an immersive viewer in response to receiving the selection by the user.

In certain embodiments, playback in the immersive viewer of one or more ephemeral content items of the ephemeral content item collections provided in the ephemeral content feed other than the selected ephemeral content item collection is performed based on an order of the second ranking.

In an embodiment, the providing of the one or more ephemeral content item collections from the first ranking increases a likelihood of the user selecting the ephemeral content item collections provided in the ephemeral content feed, and the performing the playback of the one or more ephemeral content items of the ephemeral content item collections provided in the ephemeral content feed other than the selected ephemeral content item collection based on the order of the second ranking increases a likelihood of the user spending time on the ephemeral content item collections provided in the ephemeral content feed within the immersive viewer.

In some embodiments, one or more machine learning models can be trained based on features relating to one or more of: ephemeral content item collection attributes, ephemeral content item attributes, or user attributes, and the trained machine learning models can be applied to determine one or more scores for an ephemeral content item collection.

In certain embodiments, the training the one or more machine learning models includes: training a first machine learning model to determine a score indicative of a probability of a particular user selecting an ephemeral content item collection; and training a second machine learning model to determine a score indicative of a probability of a particular user spending time on an ephemeral content item collection.

In an embodiment, the first ranking is performed based on scores of the plurality of ephemeral content item collections as determined by the first machine learning model, and the second ranking is performed based on scores of the ephemeral content item collections provided in the ephemeral content feed other than the selected ephemeral content item collection as determined by the second machine learning model.

In some embodiments, the ephemeral content item collections provided from the first ranking include one or more of: ephemeral content item collections from the first ranking having scores that satisfy a threshold value or a predetermined number of top ranked ephemeral content item collections from the first ranking.

In certain embodiments, each of one or more ephemeral content items included in an ephemeral content item collection of the plurality of ephemeral content item collections is accessible only for a predetermined time period.

In an embodiment, an ephemeral content item collection of the plurality of ephemeral content item collections is accessible only when at least one of one or more ephemeral content items included in the ephemeral content item collection is accessible.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including an example ephemeral content ranking module configured to rank ephemeral content associated with a social networking system, according to an embodiment of the present disclosure.

FIG. 5A illustrates an example first method for ranking ephemeral content associated with a social networking system, according to an embodiment of the present disclosure.

FIG. 5B illustrates an example second method for ranking ephemeral content associated with a social networking system, according to an embodiment of the present disclosure.

FIG. 5C illustrates an example third method for ranking ephemeral content associated with a social networking system, according to an embodiment of the present disclosure.

Figure 2:
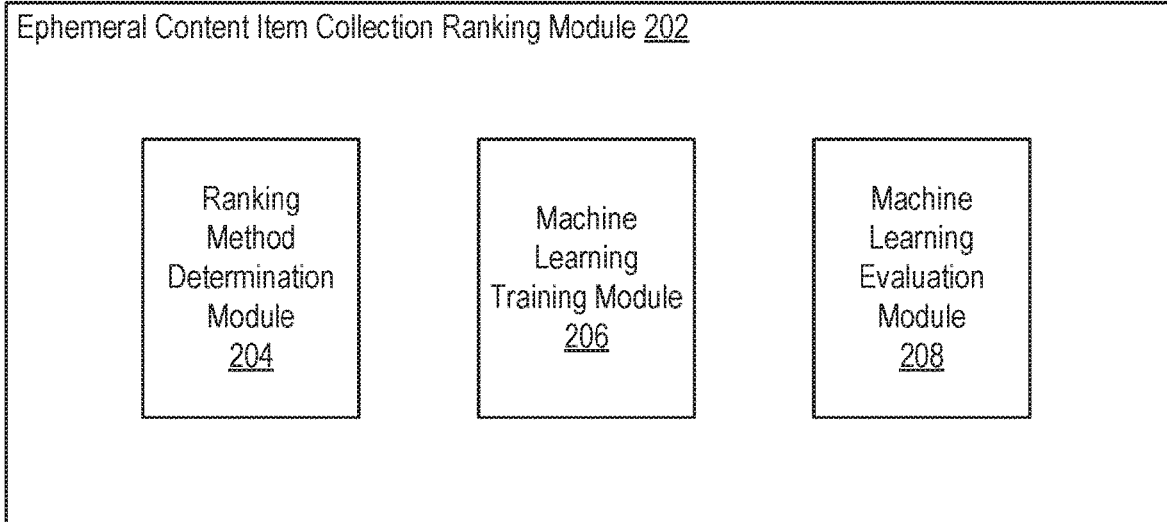
FIG. 2 illustrates an example ephemeral content item collection ranking module configured to rank ephemeral content item collections associated with a social networking system, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Ranking Ephemeral Content Item Collections Associated with a Social Networking System People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide resources through which users may publish content items. In one example, a content item can be presented on a profile page of a user. As another example, a content item can be presented through a feed for a user to access.

In some cases, content items available in a social networking system can be ephemeral. For example, a content item can only be accessible for a period of time and expire after the period of time. In some embodiments, ephemeral content items can be organized as or in an ephemeral content item collection. For example, an ephemeral content item collection associated with a user can include one or more ephemeral content items created by the user. Ephemeral content item collections may be provided via an ephemeral content feed of a user. Conventional approaches specifically arising in the realm of computer technology can rank ephemeral content item collections to be included in an ephemeral content feed of a user in chronological order or reverse chronological order. However, ranking ephemeral content item collections in chronological order or reverse chronological order may not result in presentation of ephemeral content item collections that include ephemeral content items the user is most likely to find interesting.

An improved approach rooted in computer technology can overcome the foregoing and other disadvantages associated with conventional approaches specifically arising in the realm of computer technology. Based on computer technology, the disclosed technology can rank ephemeral content item collections to include in an ephemeral content feed of a user in order to increase a likelihood of engagement by the user with ephemeral content item collections. The disclosed technology can rank the ephemeral content item collections in various ways. As an example, each ephemeral content item collection in a set of ephemeral content item collections can be ranked based on a probability of a user selecting the ephemeral content item collection and a probability of a user spending time on the ephemeral content item collection. As another example, each ephemeral content item collection in a set of ephemeral content item collections can be ranked initially based on a probability of a user selecting the ephemeral content item collection, and one or more top ranked ephemeral content item collections can be selected for inclusion in the user's ephemeral content feed. Each ephemeral content item collection in the set of ephemeral content item collections other than the selected ephemeral content item collections can be re-ranked based on a probability of the user spending time on the ephemeral content item collection, and one or more top ranked ephemeral content item collections can be included in the user's ephemeral content feed based on the ranking. As a further example, each ephemeral content item collection in a set of ephemeral content item collections can be ranked based on a probability of a user selecting the ephemeral content item collection, and one or more top ranked ephemeral content item collections can be selected for inclusion in the user's ephemeral content feed. When an ephemeral content item collection in the user's ephemeral content feed is selected by the user and viewed within an immersive viewer, each ephemeral content item collection of ephemeral content item collections in the user's ephemeral content feed other than the selected ephemeral content item collection can be re-ranked based on a probability of the user spending time on the ephemeral content item collection. The disclosed technology can rank ephemeral content item collections based on machine learning techniques. For example, one or more machine learning models can be trained to predict a likelihood of a user engaging with an ephemeral content item collection based on any one or more of the various ways of ranking described above. In this manner, the disclosed technology can rank and provide ephemeral content item collections that a user is most likely to find interesting. Additional details relating to the disclosed technology are provided below.

FIG. 1 illustrates an example system 100 including an example ephemeral content ranking module 102 configured to rank ephemeral content associated with a content providing platform, such as a social networking system, according to an embodiment of the present disclosure. The ephemeral content ranking module 102 can include an ephemeral content item generation module 104 and an ephemeral content item collection ranking module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the ephemeral content ranking module 102 can be implemented in any suitable combinations. While the disclosed technology is described in connection with ephemeral content associated with a social networking system for illustrative purposes, the disclosed technology can apply to any other type of system and/or content.

The ephemeral content provision module 104 can provide one or more ephemeral content items and/or ephemeral content item collections. Ephemeral content can refer to any type of content that is accessible only for a predetermined time period (e.g., second(s), minute(s), hour(s), day(s), etc.) or for a predetermined number of times (e.g., once, twice, etc.). For example, ephemeral content can expire after the predetermined time period passes or upon viewing by a user. In some instances, ephemeral content may be removed from servers and/or storage devices after expiration so that they are not accessible after their expiration. Examples of ephemeral content can include images, videos, audio, etc. As used herein, any content that is not ephemeral content can be referred to as non-ephemeral content. An ephemeral content item can refer to a content item that is ephemeral. One or more ephemeral content items created by users can be organized as or in ephemeral content item collections. An ephemeral content item collection can include one or more ephemeral content items and can be referred to as a "story." In some embodiments, ephemeral content items of an ephemeral content item collection can be collectively referred to as a "reel." For instance, ephemeral content items of an ephemeral content item collection can be considered to constitute a reel of the ephemeral content item collection. In some embodiments, an ephemeral content item collection may be associated with a particular user, and the ephemeral content item collection can include one or more ephemeral content items created by the particular user. An ephemeral content item collection associated with a particular user can be referred to as a "user-based ephemeral content item collection." In other embodiments, an ephemeral content item collection may be associated with a subject matter or a topic, rather than a particular user, and the ephemeral content item collection can include one or more ephemeral content items from different users that relate to the topic. An ephemeral content item collection associated with a topic can be referred to as a "topic-based ephemeral content item collection." Examples of a topic can include a geographical location, an event, a theme, etc.

The ephemeral content provision module 104 can provide ephemeral content item collections via an ephemeral content feed of a user. For example, an ephemeral content feed can be presented in a region of a user interface of a computing device running an application associated with the social networking system. A user who is associated with an ephemeral content item collection or creates an ephemeral content item included in an ephemeral content item collection can be referred to as an "authoring user." A user who has access to an ephemeral content item collection and/or an ephemeral content item in an ephemeral content feed can be referred to as a "viewing user." Various ephemeral content item collections can be provided in an ephemeral content feed of a viewing user. For example, the ephemeral content feed of the viewing user can include one or more user-based ephemeral content item collections, one or more topic-based ephemeral content item collections, and an ephemeral content item collection of the viewing user. The ephemeral content provision module 104 can provide ephemeral content item collections using various representations. For example, an ephemeral content item collection can be represented in a user interface by an avatar of a user, an icon, an image, an animation, a video, etc. Ephemeral content items of an ephemeral content item collection can be accessed by selecting a representation of the ephemeral content item collection. An ephemeral content item collection can appear or be accessible in an ephemeral content feed until all ephemeral content items included in the ephemeral content item collection expire. In some embodiments, an ephemeral content item collection can appear or be accessible in an ephemeral content feed for a predetermined time period (e.g., second(s), minute(s), hour(s), day(s), etc.). In some embodiments, the ephemeral content feed of the viewing user may display a predetermined number of ephemeral content item collections, and additional ephemeral content item collections can be displayed in response to navigation by the viewing user. For example, the viewing user can scroll through the ephemeral content feed.

A viewing user can engage with an ephemeral content item collection in the viewing user's ephemeral content feed by selecting the ephemeral content item collection. A viewing user can select an ephemeral content item collection in various manners, for example, by a click, a touch gesture, etc. Upon selection of an ephemeral content item collection by a viewing user, an immersive viewer can be provided in a user interface displaying the viewing user's ephemeral content feed, and the viewing user can view ephemeral content items of ephemeral content item collections. An immersive viewer can indicate any viewer and/or user interface for presenting a content item. For example, if a viewing user selects an ephemeral content item collection in the viewing user's ephemeral content feed, the immersive viewer can be launched and initiate playback of the selected ephemeral content item collection. One or more ephemeral content items of the selected ephemeral content item collection can be played back. If playback of the selected ephemeral content item collection ends, playback of another ephemeral content item collection can start. Playback of ephemeral content item collections within the immersive viewer can be performed based on an order or sequence of playback. The viewing user may transition within the immersive viewer between ephemeral content item collections and/or ephemeral content items displayed in the viewing user's ephemeral content feed. For example, the viewing user may skip or abandon an ephemeral content item collection and/or an ephemeral content item before playback of the ephemeral content item collection and/or the ephemeral content item ends. All examples herein are provided for illustrative purposes, and there can be many variations and other possibilities.

The ephemeral content item collection ranking module 106 can rank ephemeral content item collections based on various techniques. The ephemeral content item collection ranking module 106 can rank ephemeral content item collections based on one or more machine learning models. The ephemeral content item collection ranking module 106 is described in more detail herein.

In some embodiments, the ephemeral content ranking module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the ephemeral content ranking module 102 can be, in part or in whole, implemented as software running on one or more computing devices or systems, such as on a server system or a client computing device. In some instances, the ephemeral content ranking module 102 can be, in part or in whole, implemented within or configured to operate in conjunction or be integrated with a social networking system (or service), such as a social networking system 630 of FIG. 6. Likewise, in some instances, the ephemeral content ranking module 102 can be, in part or in whole, implemented within or configured to operate in conjunction or be integrated with a client computing device, such as the user device 610 of FIG. 6. For example, the ephemeral content ranking module 102 can be implemented as or within a dedicated application (e.g., app), a program, or an applet running on a user computing device or client computing system. The application incorporating or implementing instructions for performing functionality of the ephemeral content ranking module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The data store 120 can be configured to store and maintain various types of data, such as the data relating to support of and operation of the ephemeral content ranking module 102. The data maintained by the data store 120 can include, for example, information relating to ephemeral content, ephemeral content feeds, ephemeral content item collections, ephemeral content items, machine learning models, ranking data, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the ephemeral content ranking module 102 can be configured to communicate and/or operate with the data store 120. In some embodiments, the data store 120 can be a data store within a client computing device. In some embodiments, the data store 120 can be a data store of a server system in communication with the client computing device.

FIG. 2 illustrates an example ephemeral content item collection ranking module 202 configured to rank ephemeral content item collections associated with a social networking system, according to an embodiment of the present disclosure. In some embodiments, the ephemeral content item collection ranking module 106 of FIG. 1 can be implemented with the example ephemeral content item collection ranking module 202. As shown in the example of FIG. 2, the example ephemeral content item collection ranking module 202 can include a ranking method determination module 204, a machine learning training module 206, and a machine learning evaluation module 208.

The ephemeral content item collection ranking module 202 can rank ephemeral content item collections that are candidates for inclusion in a viewing user's ephemeral content feed. For example, the ephemeral content item collection ranking module 202 can rank ephemeral content item collections to predict a likelihood of a viewing user engaging with ephemeral content item collections. A score can be determined for each ephemeral content item collection, and the score can be indicative of a likelihood of a viewing user engaging with the ephemeral content item collection. The ephemeral content item collection ranking module 202 can rank ephemeral content item collections based on respective scores. The ephemeral content item collection ranking module 202 can rank different types of ephemeral content item collections, such as user-based ephemeral content item collections and topic-based ephemeral content item collections. One or more ranked ephemeral content item collections can be provided in an ephemeral content feed based on an order of ranking.

The ranking method determination module 204 can determine a ranking method for ranking ephemeral content item collections. Ephemeral content item collections to include in a viewing user's ephemeral content feed can be ranked in various ways. The ranking method selection module 204 can select a ranking method as appropriate. In some cases, a ranking method can be defined or determined such that a likelihood of a viewing user selecting an ephemeral content item collection is maximized in an ephemeral content feed. For example, the viewing user can select an ephemeral content item collection presented in the ephemeral content feed in various manners, for example, by a click, a touch gesture, etc. In other cases, a ranking method can be defined or determined such that a likelihood of a viewing user spending time on an ephemeral content item collection is maximized in an immersive viewer or such that a selected or predetermined amount of time spent by a viewing user on an ephemeral content item collection is maximized in an immersive viewer. For example, the viewing user can spend time on the ephemeral content item collection by viewing one or more ephemeral content items of the ephemeral content item collection in the immersive viewer. As such, the likelihood of the viewing user spending time on the ephemeral content item collection can be considered to be a likelihood of the viewing user spending time on one or more ephemeral content items of the ephemeral content item collection within the immersive viewer. Similarly, the selected or predetermined amount of time spent by the viewing user on the ephemeral content item collection can be considered to be a selected or predetermined amount of time spent by the viewing user on one or more ephemeral content items of the ephemeral content item collection within the immersive viewer. For example, playback of one or more ephemeral content items of an ephemeral content item collection can begin in the immersive viewer when the viewing user selects the ephemeral content item collection in the ephemeral content feed or when the ephemeral content item collection is to be played back based on an order of playback within the immersive viewer. In some instances, the viewing user may select an ephemeral content item collection, but may not spend much time viewing ephemeral content items of the ephemeral content item collection. For example, the viewing user may skip one or more ephemeral content items and/or ephemeral content item collections or exit the immersive viewer. In certain cases, a ranking method can be defined or determined such that a likelihood of a viewing user selecting an ephemeral content item collection is maximized in an ephemeral content feed and such that a likelihood of a viewing user spending time, or a selected or predetermined amount of time spent by a viewing user, on an ephemeral content item collection is maximized in an immersive viewer.

In some embodiments, according to a first ranking method, each ephemeral content item collection in a set of ephemeral content item collections can be ranked based on a probability of a viewing user selecting the ephemeral content item collection and a probability of the viewing user spending time on the ephemeral content item collection. For example, a score of an ephemeral content item collection can be determined as follows:

$$\text{score} = P(\text{select}) * P(\text{time}) \tag{1},$$

where score indicates a score assigned to an ephemeral content item collection, P(select) indicates a probability of a viewing user selecting the ephemeral content item collection, and P(time) indicates a probability of the viewing user spending time on the ephemeral content item collection once the ephemeral content item collection is selected. In some embodiments, P(time) can be described in terms of an estimated amount of time the viewing user is likely to spend on the ephemeral content item collection. For instance, P(time) can be specified in a unit of time, such as second(s), minute(s), hour(s), etc. In certain embodiments, P(select)*P(time) can be determined as an estimated amount of time a viewing user is likely to spend on an ephemeral content item collection. For instance, a score of an ephemeral content item collection can be determined as follows:

$$\text{score} = E(\text{time}) = P(\text{select}) * E(\text{time}|\text{select}) \tag{1a},$$

where score indicates a score assigned to an ephemeral content item collection, E(time) indicates an estimated amount of time a viewing user is likely to spend on the ephemeral content item collection, P(select) indicates a probability of the viewing user selecting the ephemeral content item collection, and E(time|select) indicates an estimated amount of time the viewing user is likely to spend on the ephemeral content item collection given that the ephemeral content item collection is selected. In some embodiments, E(time|select) can be a sum or an average of an estimated amount of time the viewing user is likely to spend on each ephemeral content item in the ephemeral content item collection. An estimated amount of time can be specified in an appropriate unit of time, such as second(s), minute(s), hour(s), etc. One or more ephemeral content item collections ranked according to equation (1) or (1a) can be provided in the viewing user's ephemeral content feed based on the order of the ranking. For instance, ephemeral content item collections having scores that satisfy a threshold value can be included in the viewing user's ephemeral content feed. In other instances, a predetermined number of top ranked ephemeral content item collections can be included in the viewing user's ephemeral content feed. If the viewing user selects an ephemeral content item collection in the ephemeral content feed, an immersive viewer can be provided, and playback of ephemeral content items of ephemeral content item collections can be performed based on the order in which the ephemeral content item collections are provided in the ephemeral content feed, starting with ephemeral content items of the selected ephemeral content item collection. Scores of ephemeral content item collections according to equations (1) and (1a) can be determined based on machine learning models. For example, one or more machine learning models can be trained to determine the scores, as described below.

In other embodiments, according to a second ranking method, each ephemeral content item collection in a set of ephemeral content item collections can be ranked initially based on a probability of a viewing user selecting the ephemeral content item collection. One or more ephemeral content item collections from the initial ranking can be selected for inclusion in the ephemeral content feed based on the ranking. Ephemeral content item collections selected based on the initial ranking can be referred to as "initial ranking selected ephemeral content item collections." Then, each ephemeral content item collection in the set of ephemeral content item collections that is not selected for inclusion in the ephemeral content feed from the initial ranking can be re-ranked based on a probability of the viewing user spending time on the ephemeral content item collection. One or more ephemeral content item collections from the re-ranking can be selected for inclusion in the ephemeral content feed based on the ranking. Ephemeral content item collections selected based on the re-ranking can be referred to as "re-ranking selected ephemeral content item collections." Initial ranking selected ephemeral content item collections can be provided in the ephemeral content feed before re-ranking selected ephemeral content item collections. For example, the order of the initially selected ephemeral content item collections in the ephemeral content feed can be prioritized over or appear before the re-ranking selected ephemeral content item collections. In some cases, the initial ranking selected ephemeral content item collections can be displayed in the ephemeral content feed when the viewing user accesses the ephemeral content feed, and the re-ranking selected ephemeral content item collections can be displayed in the ephemeral content feed when the viewing user navigates through or scrolls the ephemeral content feed to access additional ephemeral content item collections.

In these embodiments, according to the second ranking method, a score of an ephemeral content item collection can be determined initially as follows:

$$\text{score} = P(\text{select}) \tag{2a},$$

where score indicates a score assigned to an ephemeral content item collection and P(select) indicates a probability of a viewing user selecting the ephemeral content item collection. One or more ephemeral content item collections ranked according to equation (2a) can be selected for inclusion in the viewing user's ephemeral content feed and provided based on the order of the ranking. For instance, ephemeral content item collections having scores that satisfy a threshold value can be selected, or a predetermined number of top ranked ephemeral content item collections can be selected. Subsequently, ephemeral content item collections, excluding ephemeral content item collections selected based on ranking according to equation (2a), can be re-ranked. For example, a score of an ephemeral content item collection can be determined as follows:

$$\text{score} = P(\text{time}) \tag{2b},$$

where score indicates a score assigned to an ephemeral content item collection and P(time) indicates a probability of a viewing user spending time on the ephemeral content item collection. For example, P(time) can be determined based on ephemeral content items included in the ephemeral content item collection. In some embodiments, P(time) can be described in terms of an estimated amount of time the viewing user is likely to spend on the ephemeral content item collection. For instance, P(time) can be specified in a unit of time, such as second(s), minute(s), hour(s), etc. One or more ephemeral content item collections ranked according to equation (2b) can be selected for inclusion in the viewing user's ephemeral content feed and provided based on the order of the ranking. For instance, ephemeral content item collections having scores that satisfy a threshold value can be selected, or a predetermined number of top ranked ephemeral content item collections can be selected. If the viewing user selects an ephemeral content item collection in the ephemeral content feed, an immersive viewer can be provided, and playback of ephemeral content items of ephemeral content item collections can be performed based on the order in which the ephemeral content item collections are provided in the ephemeral content feed, starting with ephemeral content items of the selected ephemeral content item collection. In these embodiments, ephemeral content item collections selected based on equation (2a) can appear first in the viewing user's ephemeral content feed and ephemeral content item collections selected based on equation (2b) can appear subsequent to the ephemeral content item collections selected based on equation (2a). In this way, ephemeral content item collections that the viewing user is likely to select can be displayed more prominently in the ephemeral content feed, which can increase a likelihood of the viewing user selecting an ephemeral content item collection and viewing ephemeral content items of ephemeral content item collections in an immersive viewer. Within the immersive viewer, after playback of ephemeral content items of the ephemeral content item collections that the viewing user is likely to select, ephemeral content items of ephemeral content item collections that the viewing user is likely to spend time on can be played back, for example, automatically, which can lead to the viewing user spending more time on ephemeral content item collections within the immersive viewer. Scores of ephemeral content item collections according to equations (2a) and (2b) can be determined based on machine learning models. For example, one or more machine learning models can be trained to determine the scores, as described below.

In certain embodiments, according to third a ranking method, each ephemeral content item collection in a set of ephemeral content item collections can be ranked based on a probability of a viewing user selecting the ephemeral content item collection, and one or more ranked ephemeral content item collections can be included in the viewing user's ephemeral content feed based on the ranking. When the viewing user selects an ephemeral content item collection in the ephemeral content feed, an immersive viewer is provided to initiate playback of the selected ephemeral content item collection. In order to determine an order of playback of the ephemeral content item collections within the immersive viewer, each ephemeral content item collection of ephemeral content item collections included in the ephemeral content feed can be re-ranked based on a probability of the viewing user spending time on the ephemeral content item collection. For example, remaining ephemeral content item collections other than the selected ephemeral content item collection can be re-ranked, and playback of the remaining ephemeral content item collections can be performed based on the order of the re-ranking. When the viewing user is viewing ephemeral content items of the selected ephemeral content item collection in the immersive viewer, the viewing user may not necessarily expect the order of playback of ephemeral content item collections in the immersive viewer to be the same as the order in which the ephemeral content item collections are displayed in the ephemeral content feed. Accordingly, for playback in the immersive viewer, each ephemeral content item collection of the remaining ephemeral content item collections can be re-ranked based on a probability of the viewing user spending time on the ephemeral content item collection. The order in which the ephemeral content item collections are displayed in the ephemeral content feed can stay the same even though the remaining ephemeral content item collections are re-ranked for playback in the immersive viewer.

In these embodiments, according to the third ranking method, a score of an ephemeral content item collection can be determined as follows:

$$\text{score}=P(\text{select}) \quad (3a),$$

where score indicates a score assigned to an ephemeral content item collection and P(select) indicates a probability of a viewing user selecting the ephemeral content item collection. Equation (3a) is the same as equation (2a) above. One or more ephemeral content item collections ranked according to equation (3a) can be provided in the viewing user's ephemeral content feed based on the order of the ranking. For instance, ephemeral content item collections having scores that satisfy a threshold value can be included in the viewing user's ephemeral content feed. In other instances, a predetermined number of top ranked ephemeral content item collections can be included in the viewing user's ephemeral content feed. Once the viewing user selects an ephemeral content item collection in the ephemeral content feed and the immersive viewer is launched to initiate playback of the selected ephemeral content item collection, scores of remaining ephemeral content item collections included in the ephemeral content feed other than the selected ephemeral content item collection can be determined as follows:

$$\text{score}=P(\text{time}) \quad (3b),$$

where score indicates a score assigned to an ephemeral content item collection and P(time) indicates a probability of a viewing user spending time on the ephemeral content item collection. For example, P(time) can be determined based on ephemeral content items included in the ephemeral content item collection. In some embodiments, P(time) can be described in terms of an estimated amount of time the viewing user is likely to spend on the ephemeral content item collection. For instance, P(time) can be specified in a unit of time, such as second(s), minute(s), hour(s), etc. Equation (3b) is the same as equation (2b) above. The remaining ephemeral content item collections can be ranked based on respective scores as determined based on equation (3b). Within the immersive viewer, playback of the remaining ephemeral content item collections can be performed according to the ranking based on equation (3b). For example, when playback of the selected ephemeral content item collection ends, playback of a subsequent ephemeral content item collection according to the ranking based on equation (3b) can start. In some embodiments, since ephemeral content items of an ephemeral content item collection can be considered to be a reel of the ephemeral content item collection, as mentioned above, re-ranking of ephemeral content item collections to determine order of playback can be considered to be re-ranking of reels of ephemeral content item collections. In this way, in the ephemeral content feed, a likelihood of the viewing user selecting an ephemeral content item collection can be increased, and in the immersive viewer, a likelihood of the viewing user spending time on ephemeral content item collections can be increased. In certain embodiments, ephemeral content items of ephemeral content item collections can also be ranked based on a probability of the viewing user spending time on the ephemeral content items in order to determine an order for playback. Scores of ephemeral content item collections according to equations (3a) and (3b) can be determined based on machine learning models. For example, one or more machine learning models can be trained to determine the scores, as described below. Many variations are possible.

The machine learning training module 206 can train a machine learning model to rank ephemeral content item collections for a viewing user's ephemeral content feed. For instance, the machine learning training module 206 can train one or more machine learning models to determine scores of ephemeral content item collections based on equations (1), (1a), (2a), (2b), (3a), and/or (3b) above. The machine learning training module 206 can train a separate machine learning model for each equation or each component of an equation, such as P(select), P(time), E(time), and/or E(time|select).

The machine learning training module 206 can train a machine learning model to rank ephemeral content item collections based on various types of training data. The training data can include various features. For example, features can relate to ephemeral content item collection attributes, ephemeral content item attributes, user attributes, etc. Ephemeral content item collection attributes can include any attributes associated with ephemeral content item collections. Examples of ephemeral content item collection attributes can include an authoring user of an ephemeral content item collection and/or an ephemeral content item, one or more ephemeral content items included in an ephemeral content item collection, a number of ephemeral content items included in an ephemeral content item collection, one or more viewing users of an ephemeral content item collection and/or an ephemeral content item, a rate of selection of an ephemeral content item collection by viewing users, a selection of an ephemeral content item collection by a specific viewing user, a rate of selection of an ephemeral content item by viewing users, a selection of an ephemeral content item by a specific viewing user, historical information associated with an ephemeral content item collection, visual characteristics of a representation of an ephemeral content item collection, whether an ephemeral content item collection includes a live ephemeral content item, whether an ephemeral content item collection includes an expiring ephemeral content item, etc. Historical information associated with an ephemeral content item collection can include whether a viewing user has selected an ephemeral content item collection of a particular authoring user at one or more previous times when the ephemeral content item collection of the authoring user was included in the viewing user's ephemeral content feed, a ranking or position of an ephemeral content item collection of a particular authoring user at one or more previous times when the ephemeral content item collection was included in the viewing user's ephemeral content feed, etc. Visual characteristics of a representation of an ephemeral content item collection can include a color, one or more objects included in the representation, a subject matter or topic included in the representation, etc.

Ephemeral content item attributes can include any attributes associated with ephemeral content items. Examples of ephemeral content item attributes can include content attributes, such as a type of media (e.g., an image, a video, an audio, text, etc.), a length of content, a subject matter or topic, one or more objects represented in content, a popularity of content (e.g., many users interacting with content), etc. Examples ephemeral content item attributes can also include whether viewing users spent time on an ephemeral content item, an amount of time viewing users spent on an ephemeral content item, whether viewing users spent a threshold amount of time on an ephemeral content item, etc.

User attributes can include any attributes associated with users. User attributes can include attributes associated with authoring users and attributes associated with viewing users. Examples of user attributes can include a location (e.g., a country, state, county, city, etc.), an age, an age range, a gender, a language, a number of connections (e.g., friends or followers), an interest (e.g., topics in which a user has expressed interest), a computing device, an operating system (OS), etc. User attributes can also include attributes associated with connections between authoring users and viewing users. For example, a user can be a connection of another user (e.g., a friend or a follower), and a coefficient or weight can be associated with the connection. The coefficient can be indicative of a strength of the connection. In some embodiments, a connection between two users is two-way such that when the connection is established between a first user and a second user, the two users are connections of each other. In other embodiments, a connection between two users can be one-way such that a first user is a connection of a second user, but the second user is not a connection of the first user. In these embodiments, users can be subscribers or followers of other users. User attributes can further include attributes associated with interactions between authoring users and viewing users. Examples of interactions between authoring users and viewing users can include whether a viewing user liked a content item in an authoring user's feed or profile, whether a viewing user sent a direct message to an authoring user, etc. Many variations are possible.

The training data can include various labels. The labels can include labels indicating whether viewing users selected ephemeral content item collections, labels indicating whether viewing users spent time on ephemeral content item collections and/or ephemeral content items, labels indicating an amount of time viewing users spent on ephemeral content item collections and/or ephemeral content items, and/or labels indicating whether viewing users spent a threshold amount of time on ephemeral content item collections and/or ephemeral content items.

The machine learning training module 206 can determine weights associated with various features used to train a machine learning model based on, for example, regression techniques. In some embodiments, the machine learning model can be a neural network. The machine learning training module 206 can determine which features are most successful in predicting engagement with ephemeral content item collections by viewing users. Features for training the machine learning model can vary for different types of ephemeral content item collections, such as user-based ephemeral content item collections and topic-based ephemeral content item collections. For example, attributes associated with interactions between authoring users and viewing users may not be as important to topic-based ephemeral content item collections, compared to user-based ephemeral content item collections, since authoring users and viewing users of topic-based ephemeral content item collections generally are not connections of each other.

The machine learning evaluation module 208 can apply the trained machine learning model to rank ephemeral content item collections for a viewing user's ephemeral content feed. For example, the trained machine learning model can be applied to feature data relating to an ephemeral content item collection, one or more ephemeral content items of the ephemeral content item collection, and a viewing user to determine a score for the ephemeral content item collection. For example, the score can be based on any of the equations described above, such as equations (1), (1a), (2a), (2b), (3a), and/or (3b). Ephemeral content item collections can be ordered according to their respective scores. In some embodiments, the machine learning evaluation module 208 can rank ephemeral content item collections for a viewing user's ephemeral content feed each time the ephemeral content feed is refreshed. In these embodiments, ephemeral content item collections and/or ordering of ephemeral content item collections displayed to the viewing user may change each time. One or more machine learning models discussed in connection with the ephemeral content ranking module 102 and its components can be implemented separately or in combination, for example, as a single machine learning model, as multiple machine learning models, as one or more staged machine learning models, as one or more combined machine learning models, etc. All examples herein are provided for illustrative purposes, and there can be many variations and other possibilities.

Figure 3:
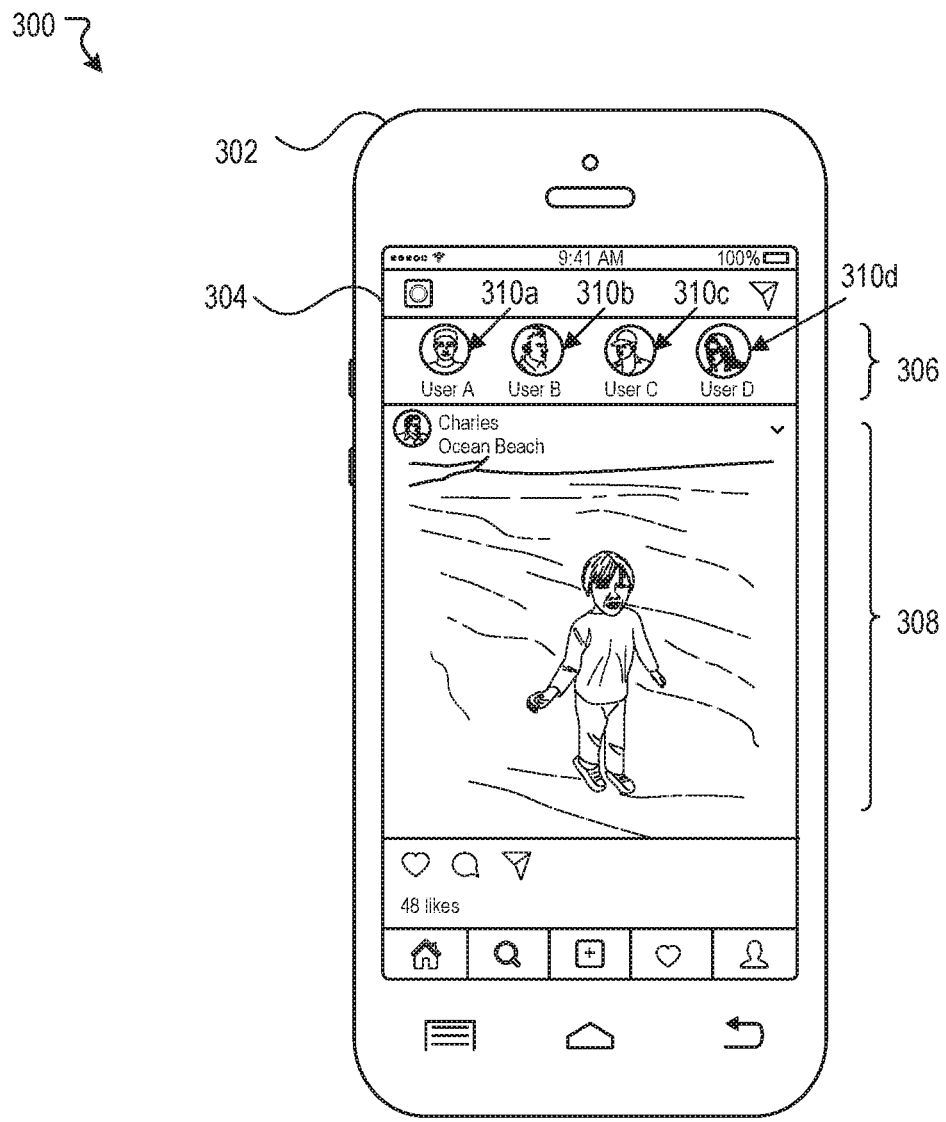
FIG. 3 illustrates an example scenario for providing ranked ephemeral content associated with a social networking system, according to an embodiment of the present disclosure.

FIG. 3 illustrates an example scenario 300 for providing ranked ephemeral content associated with a social networking system, according to an embodiment of the present disclosure. The example scenario 300 illustrates a computing device 302 displaying a user interface 304 associated with a social networking system. The user interface 304 includes an ephemeral content feed 306 of a user, which includes one or more user-based ephemeral content item collections 310. In the example scenario 300, the user can be a viewing user, and user-based ephemeral content item collections can be ranked as candidates for inclusion in the user's ephemeral content feed 306. The ranking of ephemeral content item collections can be performed by the ephemeral content ranking module 102, as discussed herein. The user's ephemeral content feed 306 can include the user's own user-based ephemeral content item collection 310a and a predetermined number of top ranked user-based ephemeral content item collections 310b, 310c, 310d. The example scenario 300 illustrates user-based ephemeral content item collections 310a, 310b, 310c, and 310d in the user's ephemeral content feed 306. The user's ephemeral content feed 306 can be scrolled right in order to show more user-based ephemeral content item collections. In some embodiments, the user's ephemeral content feed 306 can also include one or more topic-based ephemeral content item collections. The user interface 304 also includes a feed 308 of the user, which can include non-ephemeral content items. All examples herein are provided for illustrative purposes, and there can be many variations and other possibilities.

Figure 4A:
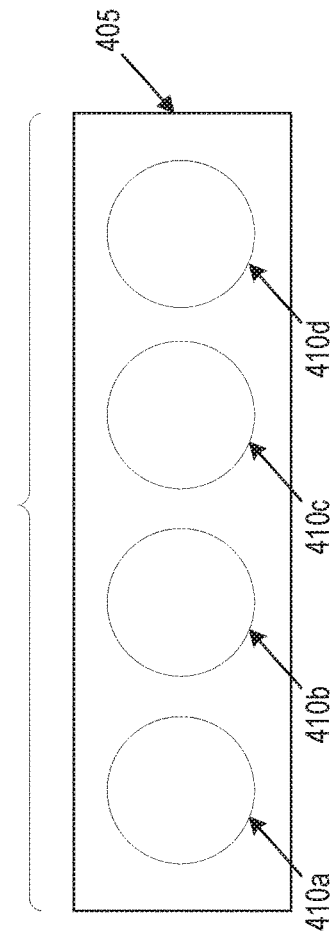
FIGS. 4A-4C illustrate example scenarios for ranking ephemeral content item collections associated with a social networking system, according to an embodiment of the present disclosure.

FIG. 4A illustrates an example scenario 400 for ranking ephemeral content associated with a social networking system, according to an embodiment of the present disclosure. The example scenario 400 shows an ephemeral content feed 405 of a viewing user that includes ephemeral content item collections 410a-d. The ephemeral content feed 405 can be the same as or similar to the ephemeral content feed 306 in FIG. 3. Ephemeral content item collections can be ranked by the ephemeral content ranking module 102, as described above. In the example scenario 400, each ephemeral content item collection in a set of ephemeral content item collections is ranked based on a probability of a viewing user selecting the ephemeral content item collection, P(select), and a probability of the viewing user spending time on the ephemeral content item collection, P(time). For example, each ephemeral content item collection in the set of ephemeral content item collections can be ranked based on equation (1). The ephemeral content item collections 410a-d can represent ephemeral content item collections that are selected for inclusion in the ephemeral content feed 405 based on P(select)*P(time). In some embodiments, as mentioned above, P(select)*P(time) can be considered in terms of E(time), which is equal to P(select)*E(time|select). In these embodiments, each ephemeral content item collection in the set of ephemeral content item collections can be ranked based on equation (1 a). In these embodiments, the ephemeral content item collections 410a-d can represent ephemeral content item collections that are selected for inclusion in the ephemeral content feed 405 based on P(select)*E(time|select). All examples herein are provided for illustrative purposes, and there can be many variations and other possibilities.

Figure 4B:
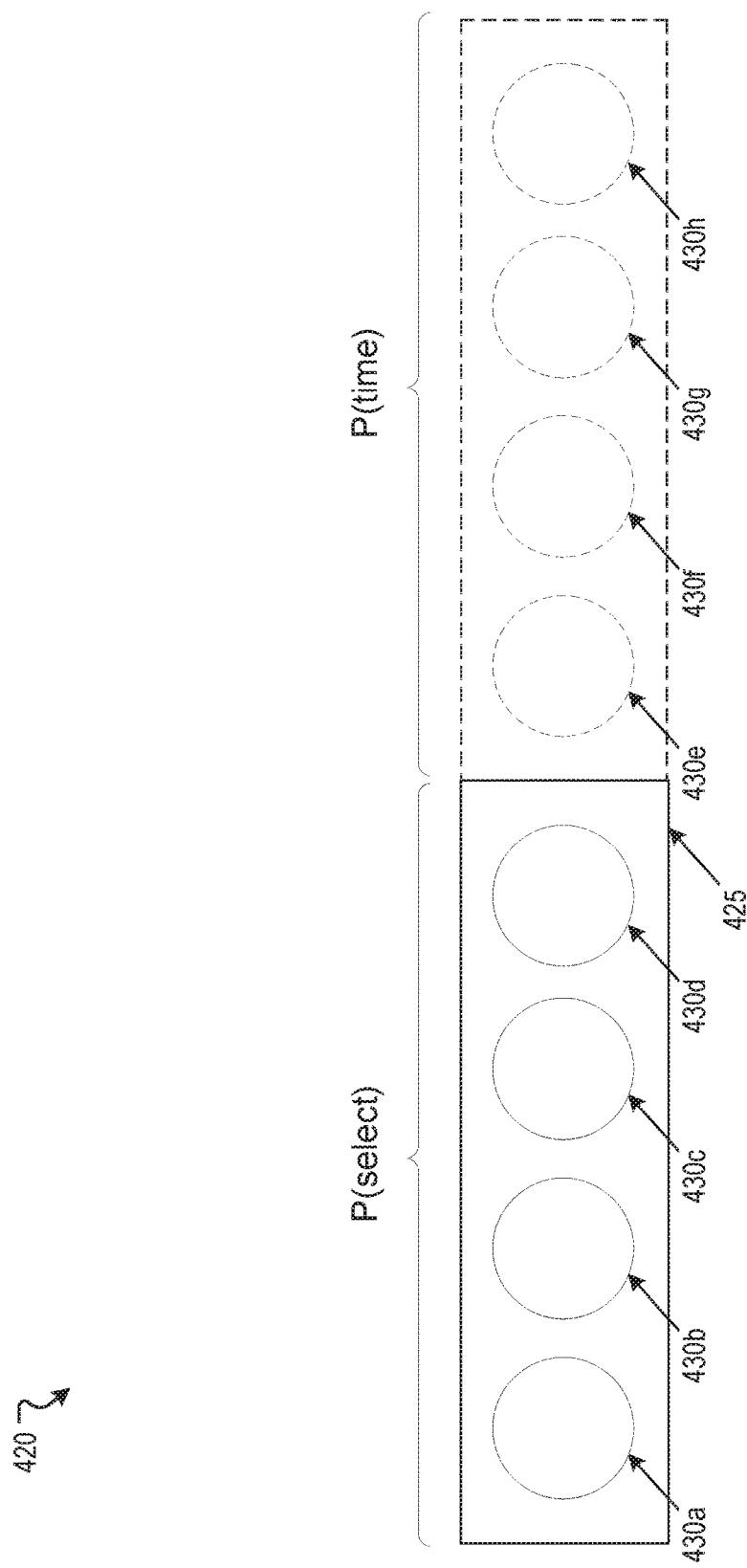

FIG. 4B illustrates an example scenario 420 for ranking ephemeral content associated with a social networking system, according to an embodiment of the present disclosure. The example scenario 420 shows an ephemeral content feed 425 of a viewing user that includes ephemeral content item collections 430a-h. The ephemeral content feed 425 can be the same as or similar to the ephemeral content feed 306 in FIG. 3. Ephemeral content item collections can be ranked by the ephemeral content ranking module 102, as described above. In the example scenario 420, each ephemeral content item collection in a set of ephemeral content item collections is ranked initially based on a probability of a viewing user selecting the ephemeral content item collection, P(select). For example, each ephemeral content item collection in the set of ephemeral content item collections can be ranked based on equation (2a). Ephemeral content item collections 430a-d are selected for inclusion in the ephemeral content feed 425 from the initial ranking. Each ephemeral content item collection in the set of ephemeral content item collections other than the ephemeral content item collections 430a-d is then re-ranked based on a probability of the viewing user spending time on the ephemeral content item collection, P(time). For example, each ephemeral content item collection in the set of ephemeral content item collections other than the ephemeral content item collections 430a-d can be ranked based on equation (2b). Ephemeral content item collections 430e-h are selected for inclusion in the ephemeral content feed 425 based on the re-ranking. In some embodiments, the ephemeral content item collections 430e-h are not initially displayed in the ephemeral content feed 425, but can be displayed when the viewing user navigates through the ephemeral content feed 425 to access additional ephemeral content item collections, for example, by scrolling. In the example of FIG. 4B, a portion of the ephemeral content feed 425 that is not currently displayed is shown in dashed lines, and ephemeral content item collections included in this portion (e.g., the ephemeral content item collections 430e-h) are also shown in dashed lines. All examples herein are provided for illustrative purposes, and there can be many variations and other possibilities.

Figure 4C:
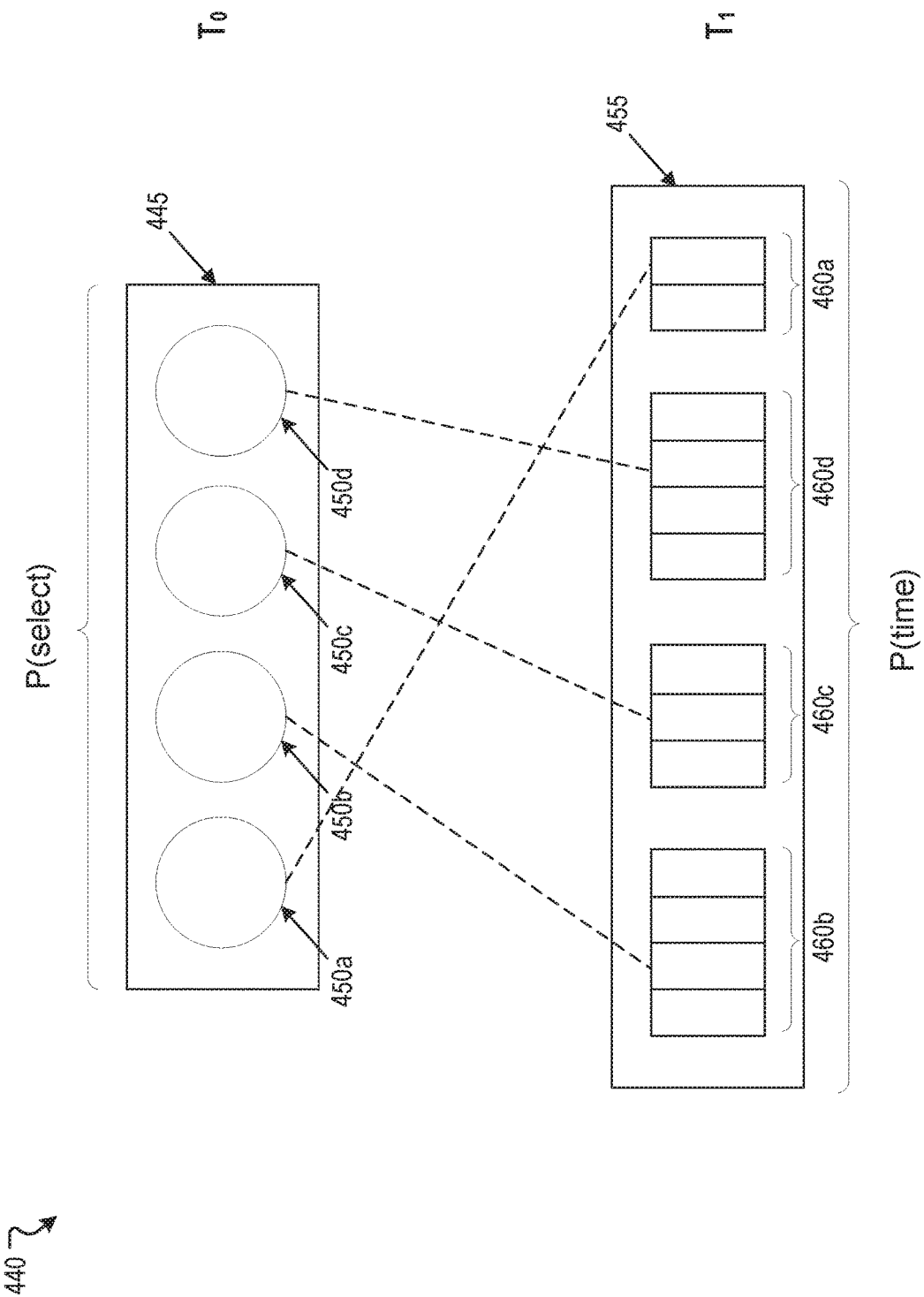

FIG. 4C illustrates an example scenario 440 for ranking ephemeral content associated with a social networking system, according to an embodiment of the present disclosure. The example scenario 440 shows an ephemeral content feed 445 of a viewing user that includes ephemeral content item collections 450a-d. The ephemeral content feed 445 can be the same as or similar to the ephemeral content feed 306 in FIG. 3. Ephemeral content item collections can be ranked by the ephemeral content ranking module 102, as described above. In the example scenario 440, each ephemeral content item collection in a set of ephemeral content item collections are ranked initially, for example, at time $T_0$, based on a probability of a viewing user selecting the ephemeral content item collection, P(select). For example, each ephemeral content item collection in the set of ephemeral content item collections can be ranked based on equation (3a). Ephemeral content item collections 450a-d are selected for inclusion in the ephemeral content feed 445 from the initial ranking. The ephemeral content item collections 450a-d can each include one or more ephemeral content items. For example, the ephemeral content item collection 450a includes ephemeral content items 460a, the ephemeral content item collection 450b includes ephemeral content items 460b, the ephemeral content item collection 450c includes ephemeral content items 460c, and the ephemeral content item collection 450d includes ephemeral content items 460d. The ephemeral content items 460a-d can each be referred to as a reel of the respective ephemeral content item collections 450a-d. If the viewing user selects one of the ephemeral content item collections 450a-d, an immersive viewer can be provided, for example, in a user interface in which the ephemeral content feed 445 is provided, and playback of ephemeral content items of the selected ephemeral content item collection can begin. In the example of FIG. 4C, an immersive viewer 455 is represented as a block that shows a sequence of ephemeral content items 460a-d of the ephemeral content item collections 450a-d in an order of playback. In the example of FIG. 4C, an ephemeral content item collection 450b is selected by the viewing user, and playback of ephemeral content items 460b of the ephemeral content item collection 450b begins in the immersive viewer 455. At this time, for example, at time the ephemeral content item collections 450a, 450c, 450d can each be re-ranked based on a probability of the viewing user spending time on the ephemeral content item collection, P(time). For example, the ephemeral content item collections 450a, 450c, 450d can each be ranked based on equation (3b). Playback of ephemeral content items of the ephemeral content item collections 450a, 450c, 450d can be performed based on the re-ranked order of the ephemeral content item collections 450a, 450c, 450d. For example, the ephemeral content items 460c can be played after the ephemeral content items 460b, the ephemeral content items 460d after that, and the ephemeral content items 460a after that. In some embodiments, the re-ranking of the ephemeral content item collections 450a, 450c, 450d in the immersive viewer 455 can be considered to be re-ranking of reels of the ephemeral content item collections 450a, 450c, 450d. All examples herein are provided for illustrative purposes, and there can be many variations and other possibilities.

FIG. 5A illustrates an example first method 500 for ranking ephemeral content associated with a social networking system, according to an embodiment of the present disclosure. It should be understood that there can be additional, fewer, or alternative steps performed in similar or alternative orders, or in parallel, based on the various features and embodiments discussed herein unless otherwise stated.

At block 502, the example method 500 can obtain a plurality of ephemeral content item collections, wherein each ephemeral content item collection of the plurality of ephemeral content item collections includes one or more ephemeral content items. At block 504, the example method 500 can determine a score for each ephemeral content item collection of the plurality of ephemeral content item collections based on a probability of a user selecting the ephemeral content item collection and a probability of the user spending time on the ephemeral content item collection. At block 506, the example method 500 can rank the plurality of ephemeral content item collections based on the respective scores of the plurality of ephemeral content item collections. Other suitable techniques that incorporate various features and embodiments of the present disclosure are possible.

FIG. 5B illustrates an example second method 520 for ranking ephemeral content associated with a social networking system, according to an embodiment of the present disclosure. It should be understood that there can be additional, fewer, or alternative steps performed in similar or alternative orders, or in parallel, based on the various features and embodiments discussed herein unless otherwise stated.

At block 522, the example method 520 can perform a first ranking to rank each ephemeral content item collection of a plurality of ephemeral content item collections based on a probability of a user selecting the ephemeral content item collection, wherein each ephemeral content item collection of the plurality of ephemeral content item collections includes one or more ephemeral content items. At block 524, the example method 520 can select one or more ephemeral content item collections from the first ranking to provide in an ephemeral content feed of the user. At block 526, the example method 520 can perform a second ranking to rank each ephemeral content item collection of the plurality of ephemeral content item collections other than the selected ephemeral content item collections from the first ranking based on a probability of the user spending time on the ephemeral content item collection. At block 528, the example method 520 can select one or more ephemeral content item collections from the second ranking to provide in the ephemeral content feed of the user. Other suitable techniques that incorporate various features and embodiments of the present disclosure are possible.

FIG. 5C illustrates an example third method 540 for ranking ephemeral content associated with a social networking system, according to an embodiment of the present disclosure. It should be understood that there can be additional, fewer, or alternative steps performed in similar or alternative orders, or in parallel, based on the various features and embodiments discussed herein unless otherwise stated.

At block 542, the example method 540 can perform a first ranking to rank each ephemeral content item collection of a plurality of ephemeral content item collections based on a probability of a user selecting the ephemeral content item collection, wherein each ephemeral content item collection of the plurality of ephemeral content item collections includes one or more ephemeral content items. At block 544, the example method 540 can provide one or more ephemeral content item collections from the first ranking in an ephemeral content feed of the user. At block 546, the example method 540 can receive a selection by the user of an ephemeral content item collection provided in the ephemeral content feed. At block 548, the example method 540 can perform a second ranking to rank each ephemeral content item collection of the ephemeral content item collections provided in the ephemeral content feed other than the selected ephemeral content item collection based on a probability of the user spending time on the ephemeral content item collection. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
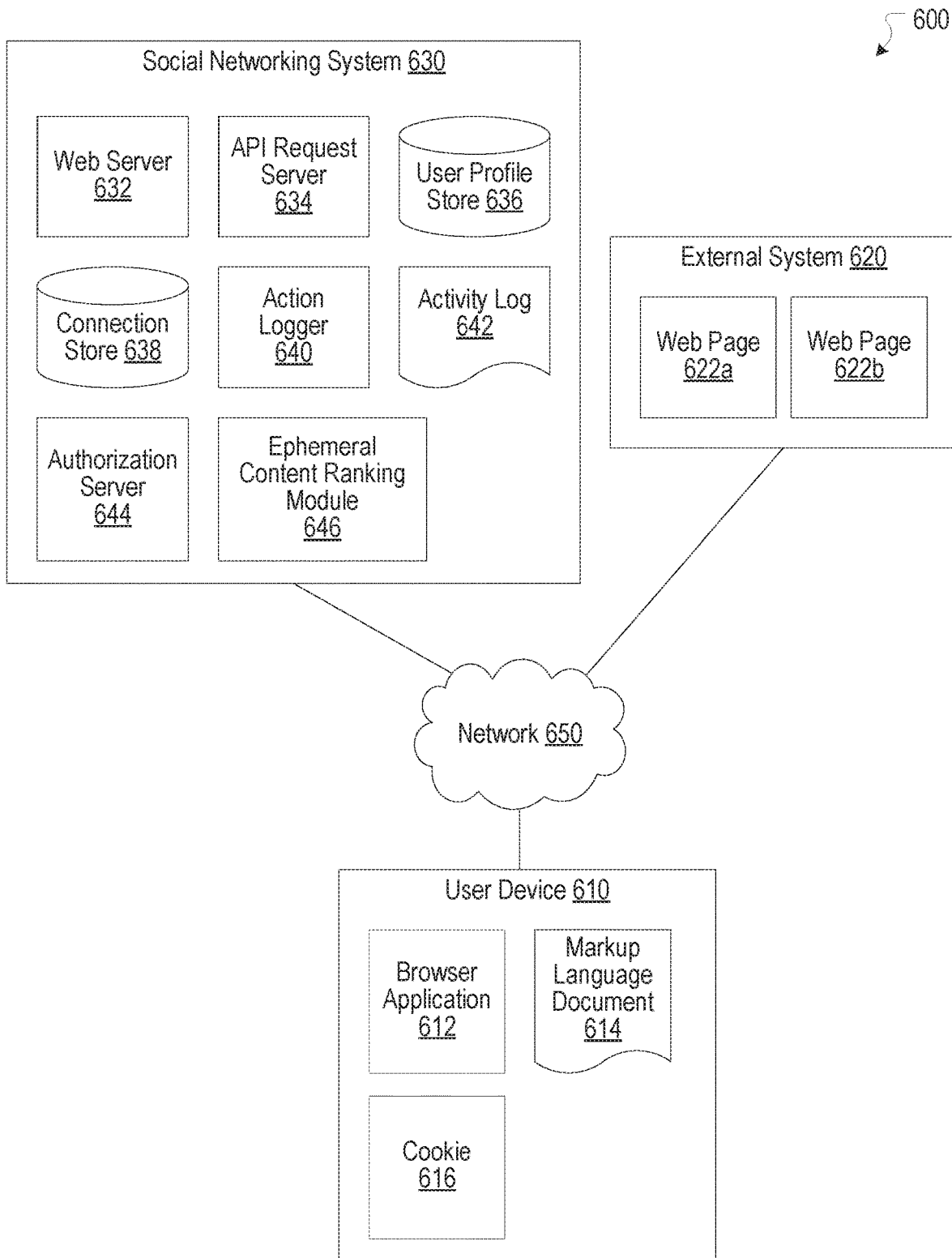
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an ephemeral content ranking module 646. The ephemeral content ranking module 646 can be implemented with the ephemeral content ranking module 102, as discussed in more detail herein. In some embodiments, one or more functionalities of the ephemeral content ranking module 646 can be implemented in the user device 610.

Hardware Implementation

Figure 7:
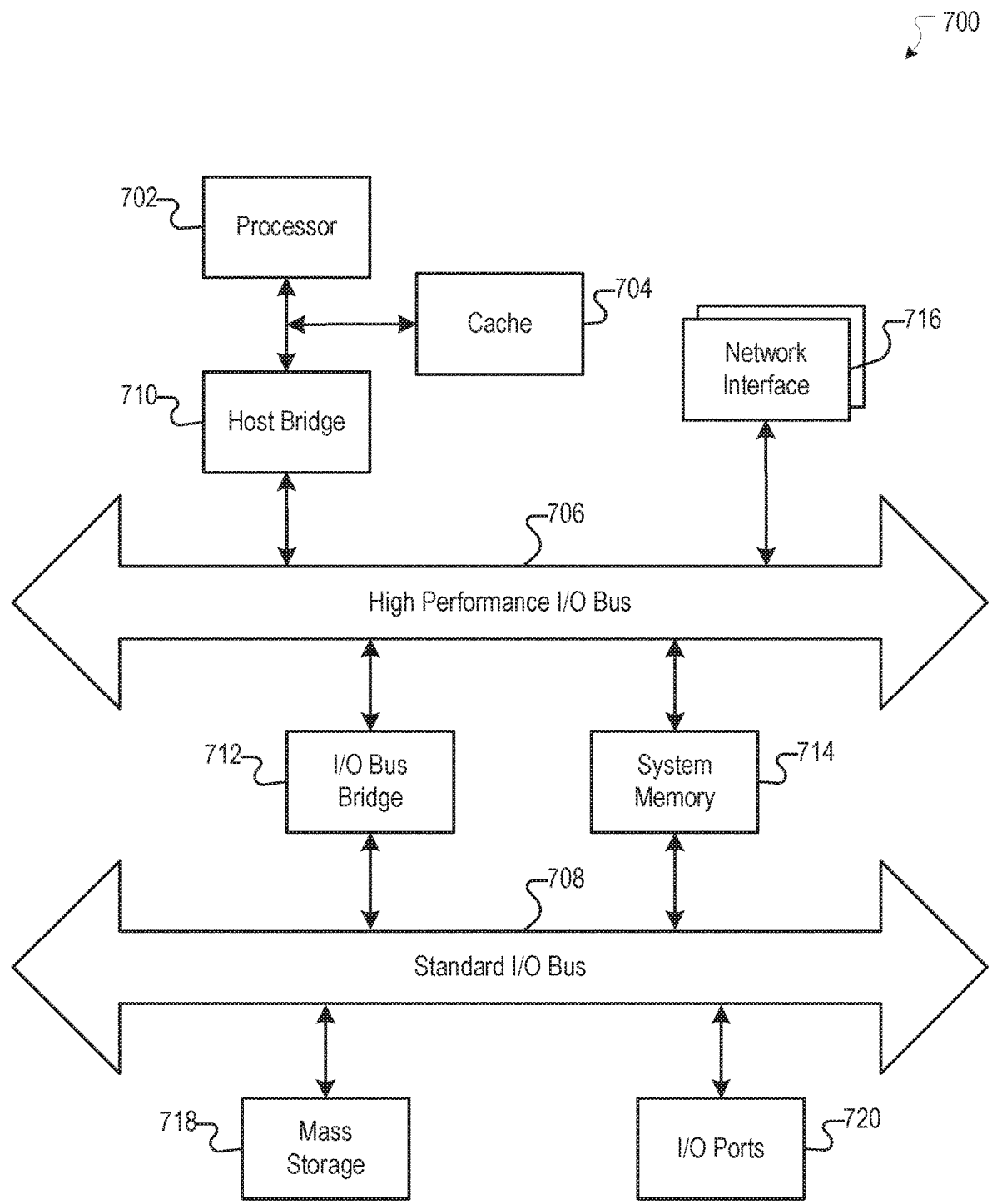
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
performing, by a computing system, a first ranking to rank each ephemeral content item collection of a plurality of ephemeral content item collections based at least in part on a probability of a user selecting the ephemeral content item collection, wherein each ephemeral content item collection of the plurality of ephemeral content item collections includes one or more ephemeral content items and the probability of the user selecting the ephemeral content item collection is based at least in part on user attributes associated with the user;
selecting, by the computing system, one or more ephemeral content item collections from the first ranking to provide in an ephemeral content feed of the user;
performing, by the computing system, a second ranking to rank each ephemeral content item collection of the plurality of ephemeral content item collections other than the selected ephemeral content item collections from the first ranking based at least in part on an estimated amount of time the user will spend on the ephemeral content item collection;
selecting, by the computing system, one or more ephemeral content item collections from the second ranking to provide in the ephemeral content feed of the user; and
providing, by the computing system, the selected ephemeral content item collections from the first ranking in the ephemeral content feed based at least in part on a first order of the first ranking and the selected content item collections from the second ranking in the ephemeral content feed based at least in part on a second order of the second ranking; and
initiating, by the computing system, playback of one or more ephemeral content items of an ephemeral content item collection included in the ephemeral content feed in response to a user selection of the ephemeral content item collection, wherein the playback of one or more ephemeral content items of the selected ephemeral content item collections from the first ranking and one or more ephemeral content items of the selected ephemeral content item collections from the second ranking is performed based at least in part on the first order of the first ranking and the second order of the second ranking.

2. The computer-implemented method of claim 1, wherein the ephemeral content feed is displayed in a user interface and the one or more ephemeral content items is played back in an immersive viewer provided in the user interface.

3. The computer-implemented method of claim 1, wherein the selected ephemeral content item collections from the first ranking are provided in the ephemeral content feed before the selected ephemeral content item collections from the second ranking.

4. The computer-implemented method of claim 1, wherein the selected ephemeral content item collections from the first ranking are initially displayed in the ephemeral content feed and the selected ephemeral content item collections from the second ranking in the ephemeral content feed are displayed in response to user navigation in the ephemeral content feed.

5. The computer-implemented method of claim 1, further comprising:

training one or more machine learning models based at least in part on features relating to one or more of: training ephemeral content item collection attributes, training ephemeral content item attributes, or training user attributes; and
applying the trained machine learning models to determine one or more scores for the plurality of ephemeral content item collections.

6. The computer-implemented method of claim 5, wherein the training the one or more machine learning models includes:
training a first machine learning model to determine a score indicative of the probability of the user selecting the ephemeral content item collection; and
training a second machine learning model to determine the estimated amount of time the user will spend on the ephemeral content item collection.

7. The computer-implemented method of claim 6, wherein the first ranking is performed based at least in part on scores of the plurality of ephemeral content item collections as determined by the first machine learning model, and wherein the second ranking is performed based at least in part on scores of the plurality of ephemeral content item collections other than the selected ephemeral content item collections from the first ranking as determined by the second machine learning model.

8. The computer-implemented method of claim 1, wherein the selected ephemeral content item collections from the first ranking include one or more of: ephemeral content item collections from the first ranking having scores that satisfy a threshold value or a predetermined number of top ranked ephemeral content item collections from the first ranking.

9. The computer-implemented method of claim 1, wherein the selected ephemeral content item collections from the second ranking include one or more of: ephemeral content item collections from the second ranking having scores that satisfy a threshold value or a predetermined number of top ranked ephemeral content item collections from the second ranking.

10. A system comprising;
at least one hardware processor; and
a memory storing instructions that, when executed by the at least one hardware processor, cause the system to perform:
performing a first ranking to rank each ephemeral content item collection of a plurality of ephemeral content item collections based at least in part on a probability of a user selecting the ephemeral content item collection, wherein each ephemeral content item collection of the plurality of ephemeral content item collections includes one or more ephemeral content items and the probability of the user selecting the ephemeral content item collection is based at least in part on user attributes associated with the user;
selecting one or more ephemeral content item collections from the first ranking to provide in an ephemeral content feed of the user;
performing a second ranking to rank each ephemeral content item collection of the plurality of ephemeral content item collections other than the selected ephemeral content item collections from the first ranking based at least in part on an estimated amount of the user will spend on the ephemeral content item collection;

selecting one or more ephemeral content item collections from the second ranking to provide in the ephemeral content feed of the user;

providing the selected ephemeral content item collections from the first ranking in the ephemeral content feed based at least in part on a first order of the first ranking and the selected content item collections from the second ranking in the ephemeral content feed based at least in part on a second order of the second ranking;

initiating playback of one or more ephemeral content items of an ephemeral content item collection included in the ephemeral content feed in response to a user selection of the ephemeral content item collection, wherein the playback of one or more ephemeral content items of the selected ephemeral content item collections from the first ranking and one or more ephemeral content items of the selected ephemeral content item collections from the second ranking is performed based at least in part on the first order of the first ranking and the second order of the second ranking.

11. The system of claim 10, wherein the ephemeral content feed is displayed in a user interface and the one or more ephemeral content items is played back in an immersive viewer provided in the user interface.

12. The system of claim 10, wherein the selected ephemeral content item collections from the first ranking are provided in the ephemeral content feed before the selected ephemeral content item collections from the second ranking.

13. The system of claim 10, wherein the instructions further cause the system to perform:

training one or more machine learning models based at least in part on features relating to one or more of: training ephemeral content item collection attributes, training ephemeral content item attributes, or training user attributes; and applying the trained machine learning models to determine one or more scores for the plurality of ephemeral content item collections.

14. The system of claim 13, wherein the training the one or more machine learning models includes:

training a first machine learning model to determine a score indicative of the probability of the user selecting the ephemeral content item collection; and training a second machine learning model to determine a score indicative of the estimated amount of time the user will spend on the ephemeral content item collection.

15. A non-transitory computer readable medium including instructions that, when executed by at least one hardware processor of a computing system, cause the computing system to perform a method comprising:

performing a first ranking to rank each ephemeral content item collection of a plurality of ephemeral content item collections based at least in part on a probability of a user selecting the ephemeral content item collection, wherein each ephemeral content item collection of the plurality of ephemeral content item collections includes one or more ephemeral content items and the probability of the user selecting the ephemeral content item collection is based at least in part on user attributes associated with the user;

selecting one or more ephemeral content item collections from the first ranking to provide in an ephemeral content feed of the user;

performing a second ranking to rank each ephemeral content item collection of the plurality of ephemeral content item collections other than the selected ephemeral content item collections from the first ranking based at least in part on an estimated amount of time the user will spend on the ephemeral content item collection;

selecting one or more ephemeral content item collections from the second ranking to provide in the ephemeral content feed of the user; and providing the selected ephemeral content item collections from the first ranking in the ephemeral content feed based at least in part on a first order of the first ranking and the selected content item collections from the second ranking in the ephemeral content feed based at least in part on a second order of the second ranking;

initiating playback of one or more ephemeral content items of an ephemeral content item collection included in the ephemeral content feed in response to a user selection of the ephemeral content item collection, wherein the playback of one or more ephemeral content items of the selected ephemeral content item collections from the first ranking and one or more ephemeral content items of the selected ephemeral content item collections from the second ranking is performed based at least in part on the first order of the first ranking and the second order of the second ranking.

16. The non-transitory computer readable medium of claim 15, wherein the ephemeral content feed is displayed in a user interface and the one or more ephemeral content items is played back in an immersive viewer provided in the user interface.

17. The non-transitory computer readable medium of claim 15, wherein the selected ephemeral content item collections from the first ranking are provided in the ephemeral content feed before the selected ephemeral content item collections from the second ranking.

18. The non-transitory computer readable medium of claim 15, wherein the method further comprises:

training one or more machine learning models based at least in part on features relating to one or more of: training ephemeral content item collection attributes, training ephemeral content item attributes, or training user attributes; and applying the trained machine learning models to determine one or more scores for the plurality of ephemeral content item collections.

19. The non-transitory computer readable medium of claim 18, wherein the training the one or more machine learning models includes:

training a first machine learning model to determine a score indicative of the probability of the user selecting the ephemeral content item collection; and training a second machine learning model to determine a score indicative of the estimated amount of time the user will spend on the ephemeral content item collection.

* * * * *